US012768147B1

(12) United States Patent
Jensen

(10) Patent No.: US 12,768,147 B1
(45) Date of Patent: Oct. 20, 2026

(54) SYSTEM FOR COVERING A CAMERA LENS OF AN EARTHMOVING MACHINE

(71) Applicant: Caterpillar Inc., Peoria, IL (US)

(72) Inventor: Cameron Jensen, Granger, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 19/267,910

(22) Filed: Jul. 14, 2025

(51) Int. Cl.
*H04N 23/51* (2023.01)
*E02F 9/20* (2006.01)
*E02F 9/26* (2006.01)

(52) U.S. Cl.
CPC .............. *E02F 9/261* (2013.01); *E02F 9/205* (2013.01); *H04N 23/51* (2023.01)

(58) Field of Classification Search
CPC ........... E02F 9/261; E02F 9/205; H04N 23/51
See application file for complete search history.

(56) References Cited

U.S. PATENT DOCUMENTS 9,880,382 B1 * 1/2018 Tippy ...................... B60S 1/566
10,247,612 B2 * 4/2019 Baraldi ................... G01J 5/004
11,065,659 B2 7/2021 Costa
11,169,373 B2 * 11/2021 Dissette .................. B08B 1/143
11,283,972 B1 * 3/2022 Dahmes ................. H04N 23/54
12,001,014 B2 6/2024 Glover et al.
2014/0192410 A1 * 7/2014 Yoshimura .............. B60R 11/04 359/509
2014/0218601 A1 * 8/2014 Munoz .................. H04N 23/51 348/373
2014/0333756 A1 * 11/2014 Sogo ..................... B23K 11/115 348/90
2015/0172520 A1 * 6/2015 Lindman ................ H04N 23/51 382/190
2017/0230548 A1 * 8/2017 Costa ..................... G03B 11/04
2017/0313288 A1 * 11/2017 Tippy ...................... B60S 1/566
2018/0136045 A1 * 5/2018 Baraldi ................... G01J 5/004
2018/0364476 A1 * 12/2018 Ochiishi ................ H04N 23/51
2019/0072761 A1 * 3/2019 Dissette .................. B08B 1/143
2021/0162957 A1 * 6/2021 Sonntag .................. B60R 11/04
2021/0181501 A1 6/2021 Glover et al.
2023/0272595 A1 * 8/2023 Jensen .................... E02F 9/205 701/2

FOREIGN PATENT DOCUMENTS

CN 1900809 A 1/2007
CN 102395003 B 9/2013
CN 203426605 U 2/2014
CN 214407775 U 10/2021
CN 116500842 A 7/2023
CN 120264114 A * 7/2025 ............ B08B 3/024
JP 5834807 B2 12/2015
JP 2022185957 A 12/2022
KR 101987996 B1 * 6/2019 ............ H04N 23/51

* cited by examiner

*Primary Examiner* — John R Schnurr

(57) ABSTRACT

A system associated with remote operation of an earthmoving machine is disclosed. The system includes an enclosure to be mounted on the earthmoving machine and including a window and a port. The system further includes a camera within the enclosure and including a lens that is aligned with the window. The system further includes a gas supply coupled to the port. The system further includes a cover within the enclosure, wherein when the camera is inactive, the cover has a first position between the window and the lens, and when the camera is active, a flow of gas from the gas supply causes the cover to move away from the first position.

20 Claims, 7 Drawing Sheets

SYSTEM FOR COVERING A CAMERA LENS OF AN EARTHMOVING MACHINE

TECHNICAL FIELD

The present disclosure relates to a system for covering a lens of a camera. More particularly, the present disclosure relates to a system for inhibiting accumulation of debris on the lens of the camera when the camera is inactive.

BACKGROUND

A variety of cameras (e.g., cameras) are mounted on machines for use in environments with a high amount of debris (e.g., dust, moisture, and other contaminants) in various industries (e.g., construction, mining, agriculture, and other industries). Cameras may capture live video of a worksite to facilitate remote operation of the machine. When the cameras are not in use, the debris may accumulate on a lens of the camera, thereby obscuring the lens and preventing the camera from providing clear video.

U.S. Pat. No. 12,001,014 discloses a system and method for dust mitigation in an environment with high amounts of debris. The system may include a camera disposed within an interior volume of an enclosure. A positive flow of clean air may be maintained into an air input aperture of the enclosure, around the camera, over a lens of the camera, and out a window of the enclosure. The system may be affixed to a piece of equipment, machine, or similar structure via a positionable or pivotable mount.

SUMMARY OF THE INVENTION

In an embodiment, the present disclosure relates to a system associated with remote operation of an earthmoving machine. The system includes an enclosure to be mounted on the earthmoving machine and including a window and a port. The system further includes a camera within the enclosure and including a lens that is aligned with the window. The system further includes a gas supply coupled to the port. The system further includes a cover within the enclosure, wherein when the camera is inactive, the cover has a first position between the window and the lens, and when the camera is active, a flow of gas from the gas supply causes the cover to move away from the first position.

In another embodiment, the present disclosure relates to a system associated with remote operation of an earthmoving machine. The system includes an enclosure to be mounted on the earthmoving machine. The system includes a camera within the enclosure and a cover within the enclosure. The system further includes a controller configured to determine that the earthmoving machine is to be operated remotely. The controller is further configured to cause, based on determining that the earthmoving machine is to be operated remotely, a flow of gas into the enclosure, wherein the flow of gas into the enclosure causes the cover to move away from a first position that is between a lens of the camera and a window of the enclosure.

In yet another embodiment, the present disclosure relates to a system comprising an enclosure including a front wall, a back wall, and a side wall that collectively define an interior space of the enclosure. The front wall includes a window to be aligned with a lens of a camera that is to be positioned within the enclosure, and the rear wall including a port to be coupled to a supply of gas into the interior space of the enclosure. The system further includes a guard assembly within the interior space of the enclosure. The system further includes a pivot joint coupled to the enclosure and configured to pivot the guard assembly about a lateral axis of the enclosure. The system further includes a cover coupled to the pivot joint towards the front wall, and a plate coupled to the pivot joint towards the backwall.

DETAILED DESCRIPTION

Reference will now be made in detail to specific embodiments or features, examples of which are illustrated in the accompanying drawings. Wherever possible, the same reference numbers will be used throughout the drawings to refer to the same or the like parts.

Figure 1:
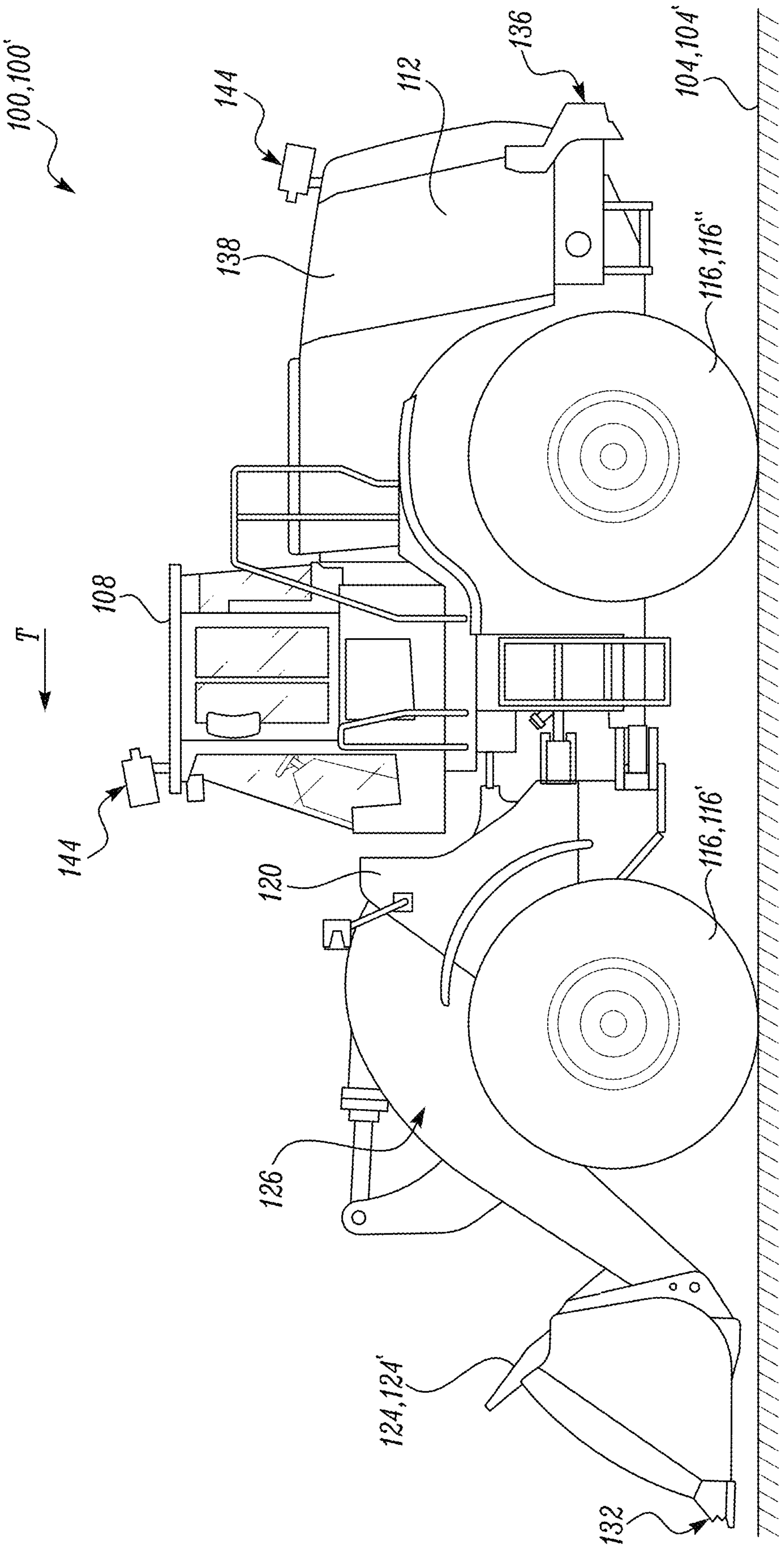
FIG. 1 is a side view of an exemplary machine including a camera, according to some embodiments of the present disclosure.
Figure 2:
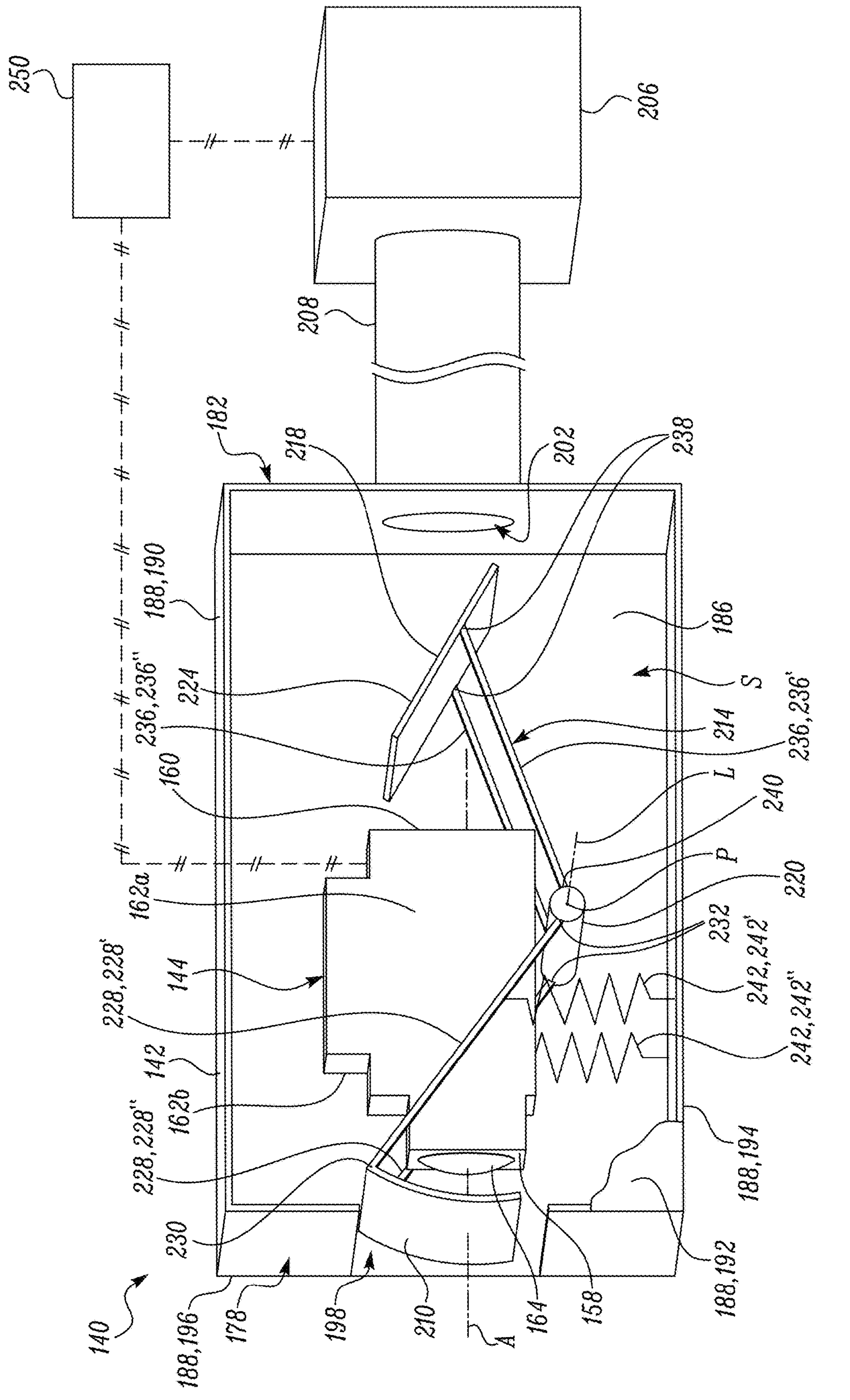
FIG. 2 is a perspective cutaway view of the system for covering a camera lens in a first position, according to some embodiments of the present disclosure.

Referring to FIG. 1, an exemplary earthmoving machine 100 is described and hereinafter referred as "machine" 100. The machine 100 may be a wheel loader 100' operable at a worksite 104 having a ground plane 104. The worksite 104 may include a mine site, a landfill, a quarry, a construction site, or any other type of worksite known in the art. Although the machine 100 is depicted as a wheel loader 100, it is contemplated that the machine 100 may embody any other type of mobile earthmoving machine, for example, a dozer, an off-highway haul truck, an excavator, a scraper, a cold planer, paver, or a motor grader.

The machine 100 may include an operator cabin or a cab 108, a propulsion system 112, and a plurality of ground-engaging members 116 configured to move the machine 100 in a direction of travel (see direction T, in FIG. 1). Further, the machine 100 may define a frame 120 and an implement 124. Further, the machine 100 may include a forward end 132 and a rearward end 136 opposite to the forward end 132. The forward end 132 and the rearward end 136 may be defined in relation to the direction of travel, T, of the machine 100 with said direction of travel, T, being defined from the rearward end 136 towards the forward end 132.

The frame 120 may accommodate and/or support the propulsion system 112, the implement 124, the ground-engaging members 116, and the cab 108, although other known components may be supported by the frame 120, as well. The ground-engaging members 116 may support and propel the frame 120 (or the machine 100) from one location to another during an operation of the machine 100. The ground-engaging members 116 may include a set of front wheels 116' and a set of rear wheels 116". In some embodiments, the ground-engaging members 116 may include crawler tracks (not shown) provided either alone or in combination with the wheels 116, 116".

The propulsion system 112 may include a power compartment 138 and a power source (not shown), such as an internal combustion engine, provided within the power compartment 138. The power source may be configured to power operations of various systems on the machine 100, typically by combusting fuel. Optionally, the propulsion system 112 may also include an electrical power source, applicable either alone or in combination with the internal combustion engine. The implement 124 may be connected to the frame 120, via a linkage assembly 126. In the present embodiment, the implement 124 is embodied as a bucket 124 configured to perform one or more work operations, such as loading, stock piling, dumping, and the like.

The cab 108 is between the implement 124 and the power compartment 138. The cab 108 may facilitate stationing of one or more operators therein, to monitor the operations of the machine 100. Also, the cab 108 may house various components and controls of the machine 100 for operators to control the movement and/or operation of the machine 100.

Referring now to FIGS. 2 to 5, a system 140 associated with remote operation of the machine 100 will now be discussed. The system 140 includes an enclosure 142 and a camera 144 positioned within the enclosure 142. The camera 144 may be supported on the frame 120 or the cab 108. The camera 144 may include a front portion 158, a rear portion 160, a first side 162*a*, and a second side 162*b*. The camera 144 includes a lens 164 on the front portion 158. The lens 164 may be a camera lens, a lamp lens, or similar front surface of the camera 144. The lens 164 may allow the camera 144 to illuminate, view, capture, or sense an environment in which the camera 144 is placed. In an example, the camera 144 is configured to capture an image of at least a portion of an environment adjacent to the machine 100. In an example, the system 140 may be configured to cover the lens 164 of the camera 144.

In an example, the camera 144 may be electrically connected to the power source of the machine 100. The camera 144 may be electrically connected to the power source via a cable or conduit for conveying power. In some embodiments, the power source may be a battery affixed, internal, or integral to the camera 144. In an example, the camera 144 may be remotely operated and controlled and may also include one or more controls (not shown) for user operation of the camera 144. The controls may be buttons, knobs, sliders, dials, or any other mechanisms which a user may press or manipulate to adjust the functionality of the camera 144.

In an example, the camera 144 may be a video camera, an infrared camera, a spectrum camera, a lamp, an infrared sensor, a radar detector, a laser, a light sensor, or any other optical instrument. In an example, the camera 144 may operate in an environment subject to a large amount of dust or other debris, such as a manufacturing or machining site.

The enclosure 142 is mounted on the machine 100. In an example, the enclosure 142 may be mounted on the cab 108 or the frame 120 of the machine 100. The enclosure 142 includes a window 198 and a port 202. In an example, the lens 164 of the camera 144 is aligned with the window 198. The window 198 may be sized and/or shaped, to correspond to the lens 164 of the camera 144. In an example, the window 198 may be substantially the same size and shape as the lens 164 of the camera 144.

The enclosure 142 may define a front wall 178, a back wall 182, and a side wall 186 that collectively define an interior space, S, of the enclosure 142. In an example, the front wall 178 includes the window 198 to be aligned with the lens 164 of the camera 144 that is to be positioned within the enclosure 142. In an example, the enclosure 142 may be sized and shaped to fit the camera 144 in the interior space, S, of the enclosure 142. While the enclosure 142 has been depicted as a generally rectangular box, it will be appreciated that the enclosure 142 may take a variety of shapes. For example, the enclosure 142 may be rounded, substantially the same shape as the camera 144, or any other suitable shape.

In some embodiments, the side wall 186 includes a plurality of segments 188 connected, along a longitudinal axis, A, of the enclosure 142. For example, the plurality of segments 188 may be coupled between respective edges of the front wall 178 and the back wall 182. The plurality of segments 188 may include a top segment 190 above the camera 144, a bottom segment 194 below the camera 144, a first lateral segment 192 on the first side 162*a* of the camera 144 along the lateral axis, L, and a second lateral segment 196 on the second side 162*b* of the camera 144 along the lateral axis, L.

The system 140 further includes a gas supply 206 coupled to the port 202 formed on the back wall 182 of the enclosure 142. In some embodiments, the back wall 182 including the port 202 may be coupled to the gas supply 206 to supply a flow of gas into the interior space, S, of the enclosure 142. In an example, the gas may be supplied into the enclosure 142 via a conduit 208 coupled to the port 202. In an example, the gas supply 206 may be a pressurized tank containing air, oxygen, or any other gas. Additionally, the gas supply 206 may be a blower, fan, or similar device capable of supplying the gas into the enclosure 142.

The system 140 further includes a cover 210 disposed within the enclosure 142. In an example, the cover 210 may be configured to be disposed between the lens 164 of the camera 144 and the window 198 of the enclosure 142.

In an example, a surface area of the cover 210 may be greater than a surface area of the lens 164. In an example, the cover 210 may be fabricated using a plastic or a similar material. The cover 210 is configured to move between a first position and a second position by the flow of gas.

In an example, when the camera 144 is inactive, the cover 210 remains in the first position between the window 198 and the lens 164. The first position may be defined as a closed position of the cover 210. For example, in the first position, the cover 210 inhibits debris from accumulating on the lens 164 during remote operation of the machine 100. In an example, the cover 210 may entirely cover the lens 164 of the camera 144 so that there is no dust or debris settled on the lens 164 when the cover 210 is in the first position. In an example, when the cover 210 is in the first position, a field of view of the camera 144 may be obstructed by the cover 210.

Further, when the camera 144 is active, the flow of gas from the gas supply 206 causes the cover 210 to move away from the first position. In an example, causing the cover 210 to move away from the first position includes causing the cover 210 to move to the second position. The second position may be defined as an open position of the cover 210. In an example, in the second position, the field of view of the camera 144 is unobstructed by the cover 210. In some embodiments, the cover 210 may not be positioned between the lens 164 of the camera 144 and the window 198 of the enclosure 142, when the cover 210 is in the second position.

In an example, when the camera 144 is active, the flow of gas exits the enclosure 142 through the window 198 to inhibit debris from accumulating on the lens 164 during remote operation of the machine 100. In an example, to cause the cover 210 to move away from the first position, the flow of gas overcomes a biasing force to pivot the cover 210 away from the first position. In an example, when the camera

144 is active, a video feed from the camera 144 is displayed at a location outside the cab 108 of the machine 100. In an example, terminating the flow of gas into the enclosure 142 may cause the cover 210 to move back to the first position.

In some embodiments, the system 140 may include a guard assembly 214 within the interior space, S, of the enclosure 142. The guard assembly 214 may include a pivot joint, P, coupled to the enclosure 142 and configured to pivot the guard assembly 214 about a lateral axis, L, of the enclosure 142. In an example, pivoting the guard assembly 214 about the lateral axis, L, causes the cover 210 to move away from a position between the window 198 and the lens 164. In some embodiments, pivoting the guard assembly 214 about the lateral axis, L, causes the cover 210 to move away from the first position to the second position.

In an example, the cover 210 is coupled to the pivot joint, P, towards the front wall 178 of the enclosure 142. The pivot joint, P, includes a shaft 220 coupled to the first lateral segment 188 and the second lateral segment 192. In an example, the shaft 220 may be cylindrical in shape, however, other shapes may be contemplated. In an example, the shaft 220 may be coupled to the first lateral segment 188 and the second lateral segment 192 in a manner such that the guard assembly 214 may pivot about the lateral axis, L.

The guard assembly 214 further includes a plate 218 coupled to the pivot joint, P, towards the back wall 182 of the enclosure 142. The plate 218 may define a surface 224 configured to receive the flow of gas to move the cover 210 from the first position to the second position. The plate 218 may include a rectangular shape, however different other shapes may be contemplated. The plate 218 may be positioned in front of the port 202 to allow the flow of gas to be directed directly onto the plate 218. In an example, the plate 218 may be positioned at an angle with respect to the port 202.

The guard assembly 214 may include one or more front arms 228 (e.g., a first front arm 228 and a second front arm 228) positioned laterally between the first side **162*a* or the second side 162*b* of the camera 144 and the respective first lateral segment 188 or the second lateral segment 192 of the side wall 186. The cover 210 may be coupled to the shaft 220 by the front arms 228. In an example, the cover 210 may be coupled to a first end 230 of each of the front arms 228 and the shaft 220 may be coupled to a second end 232 of each of the front arms 228**.

The guard assembly 214 may include one or more back arms 236 (e.g., a first back arm 236' and a second back arm 236") positioned laterally between the first side **162*a* or the second side 162*b* of the camera 144 and the respective first lateral segment 188 or the second lateral segment 192 of the side wall 186. In an example, the back arms 236 may extend in a direction opposite to the front arms 228. The plate 218 may be coupled to the shaft 220 by the back arms 236. In an example, the plate 218 may be coupled to a first end 238 of each of the back arms 236 and the shaft 220 may be coupled to a second end 240 of each of the back arms 236**.

In some embodiments, the guard assembly 214 may be coupled to a biasing member 242. In an example, the biasing member 242 may be coupled to the bottom segment 194 of the enclosure 142 and one of the front arms 228 of the guard assembly 214. The biasing member 242 may be positioned offset to the pivot joint, P, thereby allowing the guard assembly 214 to move back to the first position.

In an example, the biasing member 242 may be configured to exert a force on each of the front arms 228 to keep the cover 210 in the first position when the flow of gas is stopped. For example, when the flow of gas is stopped, the cover 210 may be configured to move from the second position to the first position by biasing force of the biasing member 242. In an example, the biasing member 242 may be a torsional spring 242, 242 configured to exert the biasing force on the front arms 228 of the guard assembly 214. In an example, the biasing member 242 may be any suitable means which may be constructed from any deformable and/or resilient materials.

In some embodiments, the system 140 may include a controller 250. The controller 250 may include a computing device having a single microprocessor or multiple microprocessors. For example, the controller 250 may include a memory, a secondary storage device, a clock, and a processing hardware, one or more of which may be used, in concert with another part of the controller 250, for accomplishing a task as discussed below in the present disclosure.

The controller 250 may be configured to determine that the machine 100 is to be operated remotely. In some embodiments, determining that the machine 100 is to be operated remotely is based on activation of the camera 144 to display the video feed from the camera 144 at the location outside the cab 108 of the machine 100. In some embodiments, the controller 250 may be configured to switch the camera 144 from inactive to active when the machine 100 is to be operated remotely. Further, the controller 250 may be configured to cause, based on determining that the machine 100 is to be operated remotely, a flow of gas into the enclosure 142.

For example, when the controller 250 switches the camera 144 from inactive to active, the flow of gas is initiated simultaneously. In an example, the flow of gas into the enclosure 142 causes the cover 210 to move away from the first position that is between the lens 164 of the camera 144 and the window 198 of the enclosure 142. For example, causing the flow of gas into the enclosure 142 causes the cover 210 to move to the second position that is not between the lens 164 and the window 198. Causing the flow of gas into the enclosure 142 causes the cover 210 to move to the second position such that the field of view of the camera 144 is unobstructed by the cover 210.

Further, the controller 250 may be configured to determine that remote operation of the machine 100 has ended. Further, the controller 250 may be configured to switch the camera 144 from active to inactive when remote operation of the machine 100 is ended. The controller 250 may be configured to stop, based on determining that the remote operation has ended, the flow of gas into the enclosure 142. For example, the flow of gas is terminated simultaneously with deactivation of the camera 144. In an example, terminating the flow of gas into the enclosure 142 causes the cover 210 to move to the first position from the second position. For example, when the controller 250 switches the camera 144 from active to inactive, moving the cover 210 back to the first position inhibits debris from accumulating on the lens 164.

Figure 6:
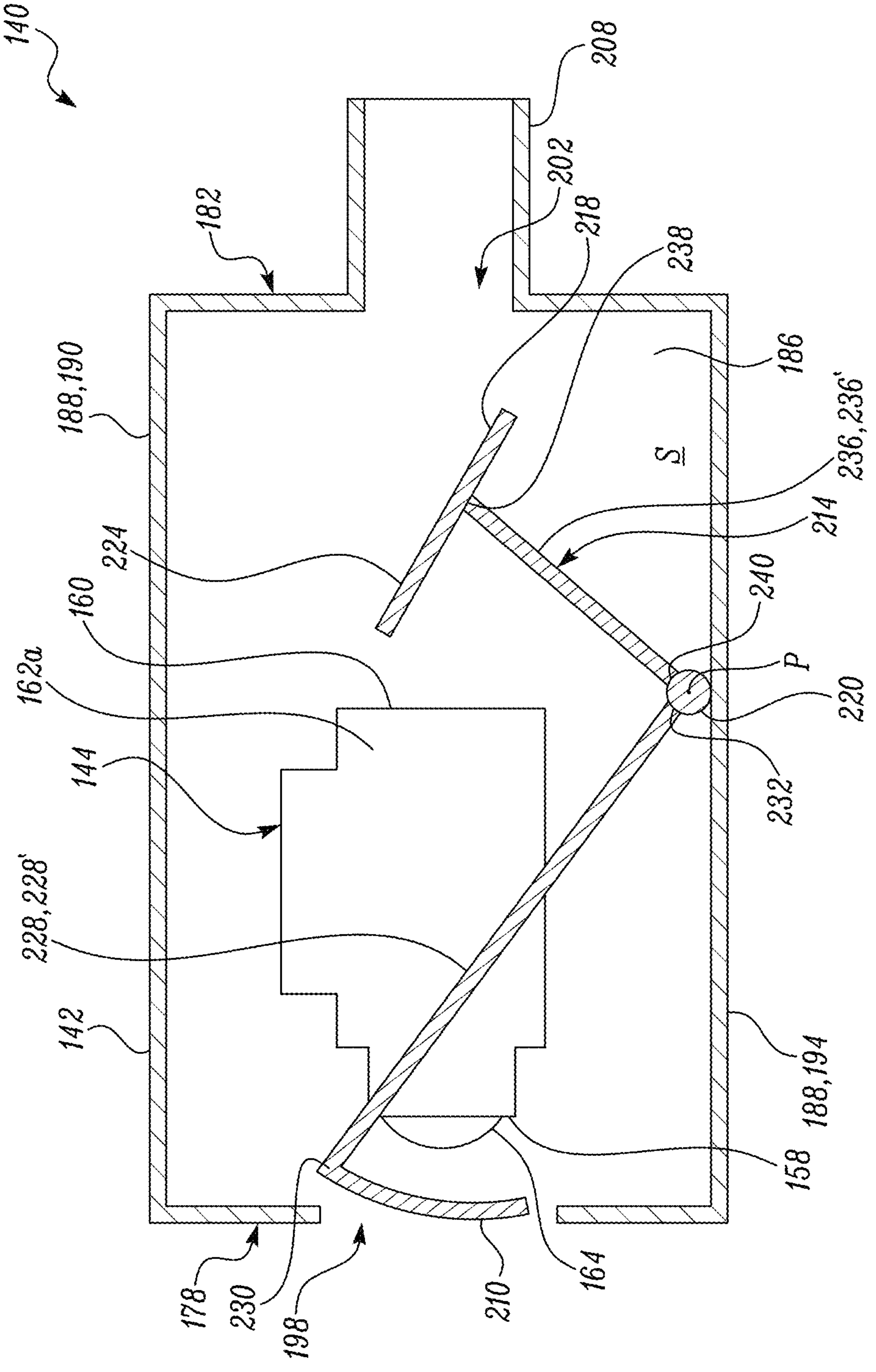
FIG. 6-7 are side cross-sectional views of the system for covering the camera lens in the first position, according to other embodiments of the present disclosure.
Figure 7:
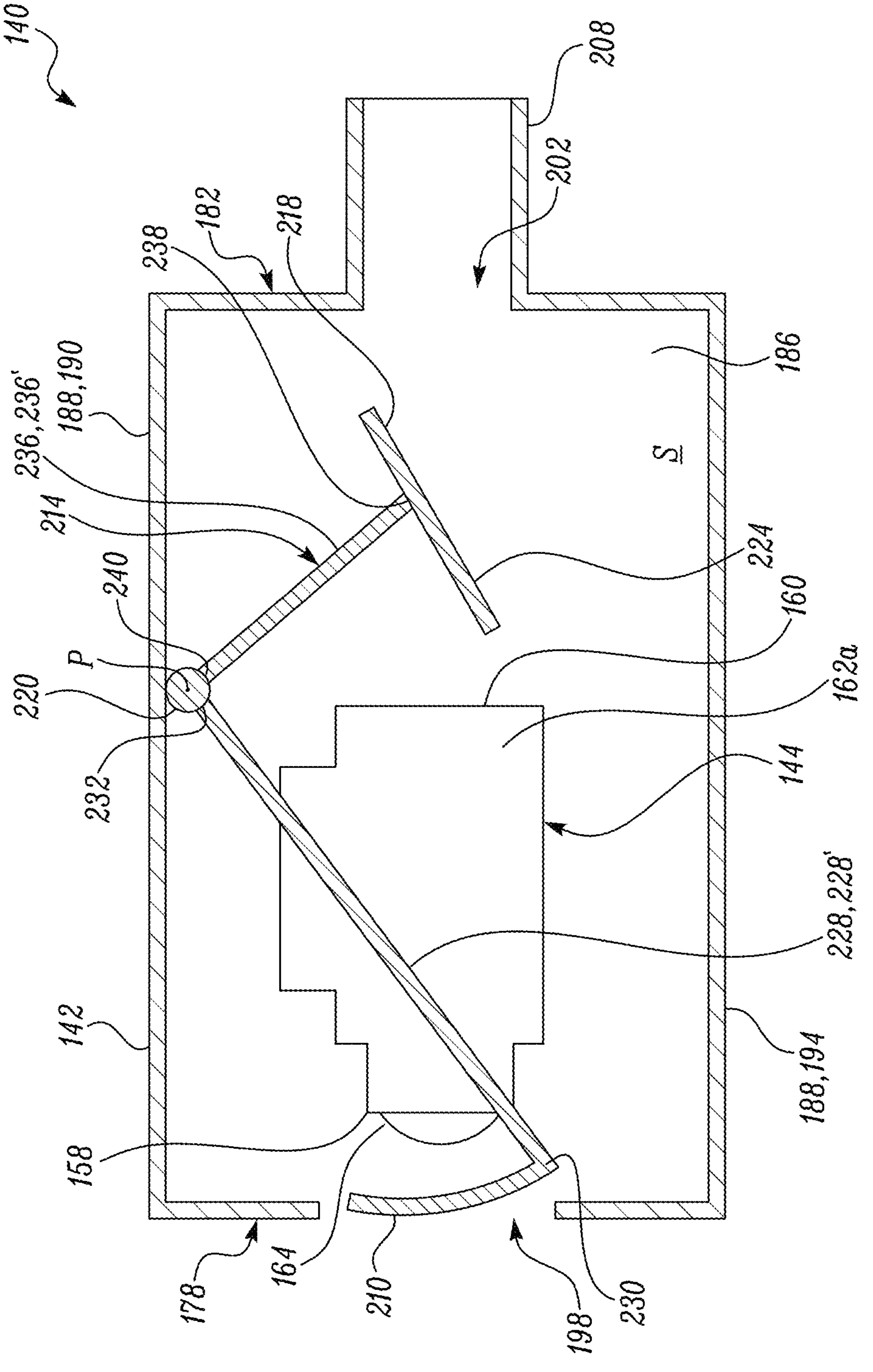

Referring now to FIGS. 6-7, in some embodiments, the biasing member 222 may be omitted. In such a case, the cover 210 may be configured to move from the first position to the second position by the flow of gas and configured to move back from the second position to the first position by force of gravity. In such a case the guard assembly 214 may be coupled to the bottom segment 194 of the enclosure 142 at the pivot joint, P. In some embodiments, the guard assembly 214 may be coupled to the top segment 190 of the enclosure 142 at the pivot joint, P. For example, the guard assembly 214 may be pivoted at the pivot joint, P, in a manner such that when the flow of gas is stopped, the center of gravity of the guard assembly 214 including the cover 210 may allow the cover 210 to move from the second position to the first position and remain at the first position.

INDUSTRIAL APPLICABILITY

Figure 3:
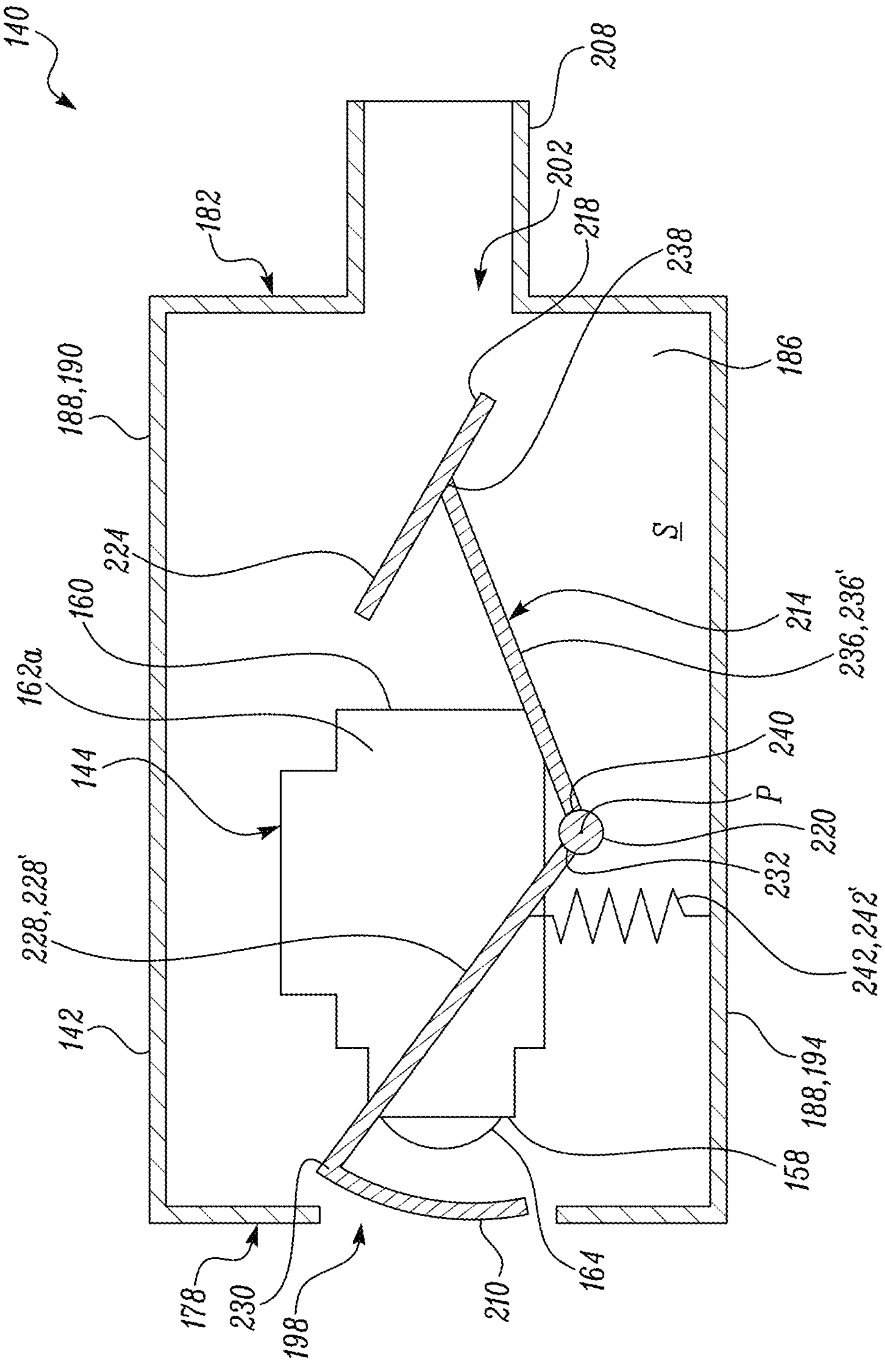
FIGS. 3-4 are side cross-sectional views of the system for covering the camera lens in the first position, according to some embodiments of the present disclosure.

The operation of the system 140 associated with remote operation of the earthmoving machine 100 will now be discussed with respect to FIGS. 3-5. During operation of the system 140, the controller 250 may be configured to determine the machine 100 is to be operated remotely. When the controller 250 determines that the machine 100 is to be operated remotely, the controller 250 may switch the camera 144 from inactive to active. Simultaneously, when the camera 144 is activated, the controller 250 may send signal to the gas supply 206 for allowing the flow of gas to pass through the port 202 into the enclosure 142.

Figure 4:
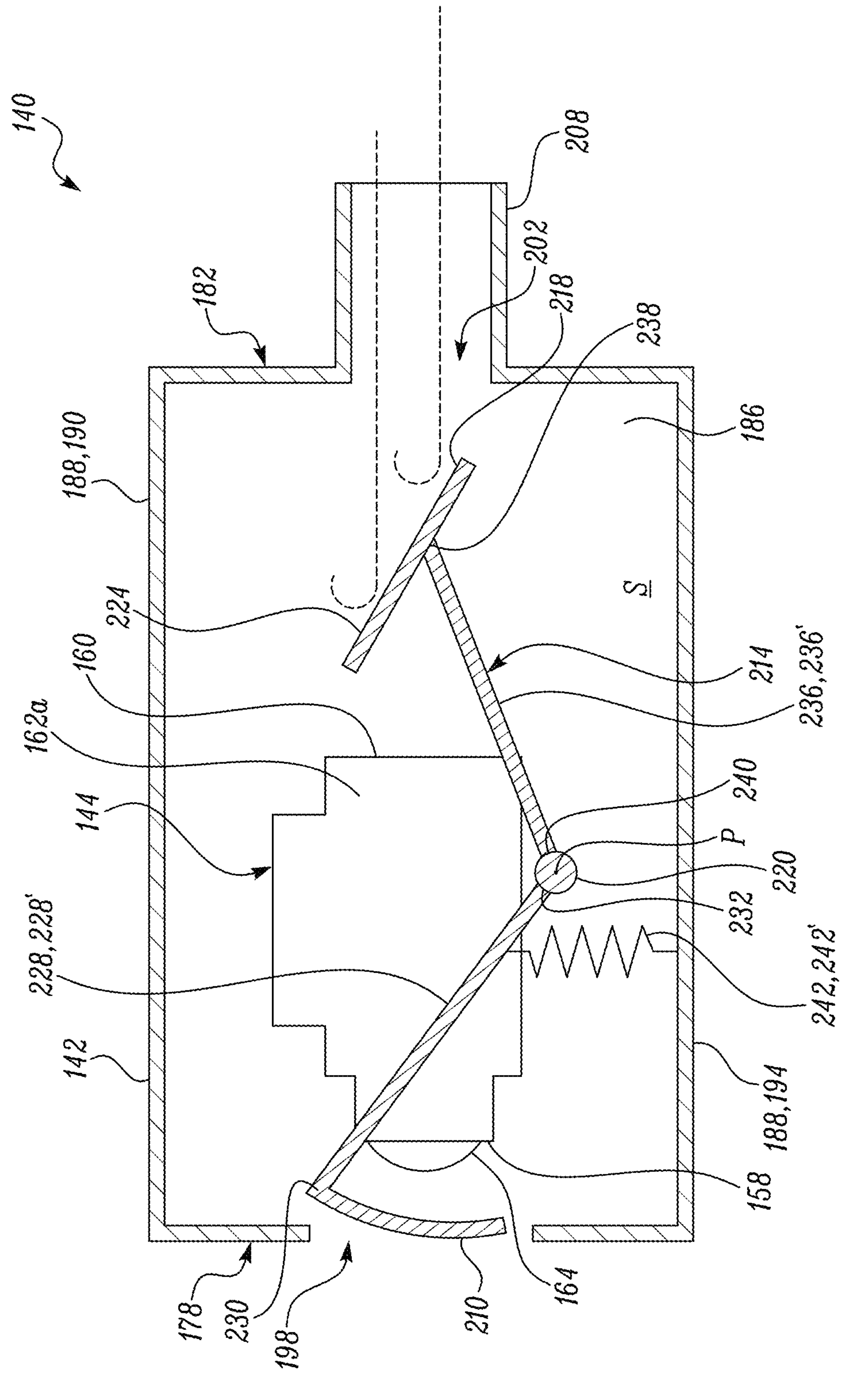
Figure 5:
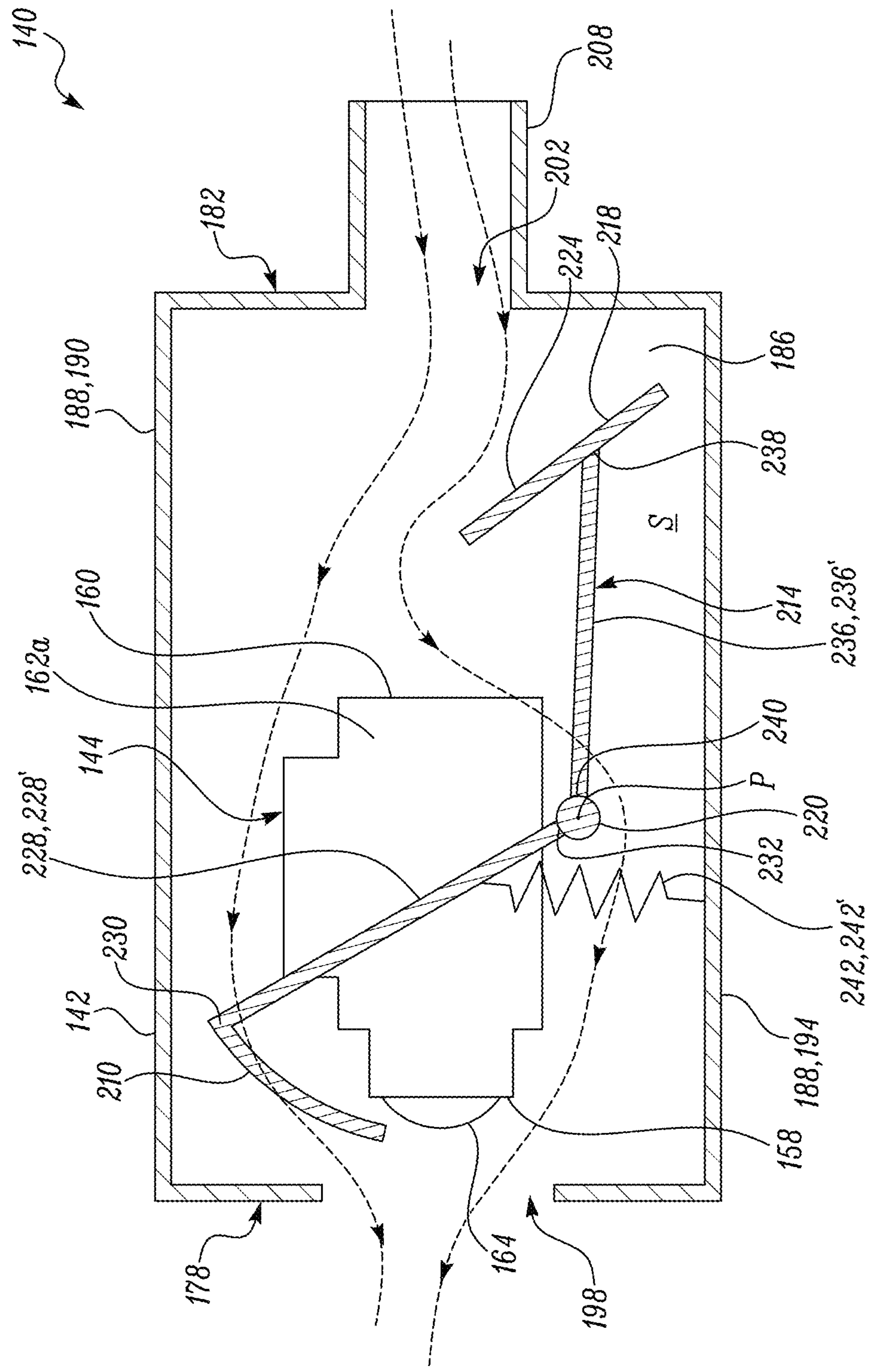
FIG. 5 is a side cross-sectional view of the system for covering the camera lens in a second position, according to some embodiments of the present disclosure.

The flow of gas may be directed from the port 202 to the plate 218 (see FIG. 4). The flow of gas may exert a force on the plate 218 thereby moving the guard assembly 214 to move about the lateral axis, L. The guard assembly 214 may move the cover 210 away from the first position to the second position (see FIG. 5). For example, the cover 210 may be moved to the second position in which cover 210 is not positioned between the lens 164 and the window 198.

At this point, the biasing member 242 is put under tension and applies the biasing force to the guard assembly 214. The flow of gas overcomes the biasing force to pivot the cover 210 away from the first position. For example, the force of flow of gas may be greater than the biasing force of the biasing member 242, thereby allowing the cover 210 to move to the second position and remain in the second position.

When the cover 210 is moved to the second position, the field of view of the camera 144 is unobstructed by the cover 210, thereby allowing the camera 144 to take the video feed. The controller 250 may allow the camera 144 to display the video feed at the location outside the cab 108 of the machine 100. At this point, the flow of gas may exit the enclosure 142 through the window 198 to inhibit debris from accumulating on the lens 164 during remote operation of the machine 100 (see FIG. 5).

Further, the controller 250 may be configured to determine the operation of machine 100 has ended. When the controller 250 determines that the operation of the machine 100 is ended, the controller 250 may switch the camera 144 from active to inactive. Simultaneously, when the camera 144 is inactive, the controller 250 may send signal to the gas supply 206 for terminating the flow of gas into the enclosure 142 through the port 202.

When the flow of gas is terminated, the plate 218 may not experience any force, thereby moving the guard assembly 214 to move about the lateral axis, L. At this point, the biasing member 242 may apply the biasing force to the guard assembly 214. The guard assembly 214 may move the cover 210 back to the first position from the second position (see FIG. 3).

For example, the cover 210 may be moved to the first position in which cover 210 is positioned between the lens 164 and the window 198. When the cover 210 is moved to the first position, the field of view of the camera 144 is obstructed by the cover 210. At this point, the cover 210 inhibits debris from accumulating on the lens 164. In some embodiments, the center of gravity of the guard assembly 214 may move the cover 210 back to the first position from the second position (see FIGS. 6-7).

The present disclosure may be configured to inhibit debris from accumulating on the lens 164 of the camera 144. The surface area of the cover 210 may be greater than the surface area of the lens 164 of the camera 144. Therefore, the cover 210 may cover the entire lens 164, thereby protecting the lens 164 from any external media such as debris or dust. For example, when the machine 100 is not used and may be parked at the worksite 104, the cover 210 may protect the lens 164 of the camera 144.

Further, when the camera 144 is inactive, the cover 210 may inhibit debris from accumulating on the lens 164. Further, when the camera 144 is active, the port 202 may provide a constant flow of air that exits the window 198 therefore, dust and similar debris may be inhibited from landing, settling, or otherwise gathering on the lens 164 of the camera 144. This ability to prevent dust or similar debris from gathering on the lens 164 of the camera 144 may prevent the lens 164 of the camera 144 from getting dirty.

As the lens 164 of the camera 144 may not become dirty, the lens 164 of the camera 144 would not need to be cleaned, thereby eliminating down time and service personnel required to clean the lens 164 of the camera 144 which may be in an inaccessible or hazardous location. Therefore, the system 140 of the present disclosure may be used in the machines which are used where a clean camera lens is required including, but not limited to, environments with high amounts of dust and debris, such as drilling or mining operations.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A system associated with remote operation of an earthmoving machine, comprising:
- an enclosure to be mounted on the earthmoving machine and including a window and a port;
- a camera within the enclosure and including a lens that is aligned with the window;
- a gas supply coupled to the port; and
- a cover within the enclosure, wherein:
  - when the camera is inactive, the cover has a first position between the window and the lens, and
  - when the camera is active, a flow of gas from the gas supply causes the cover to move away from the first position.

2. The system of claim 1, wherein causing the cover to move away from the first position includes causing the cover to move to a second position,
- wherein, in the second position, a field of view of the camera is unobstructed by the cover.

3. The system of claim 1, wherein, when the cover is in the first position, a field of view of the camera is obstructed by the cover.

4. The system of claim 1, further comprising:
- a controller configured to switch the camera from inactive to active when the earthmoving machine is to be operated remotely,
- wherein, when the camera is active, a video feed from the camera is displayed at a location outside a cab of the earthmoving machine.

5. The system of claim 1, further comprising:

a controller configured to switch the camera from active to inactive when remote operation of the earthmoving machine is ended, wherein, when the camera is inactive, the first position of the cover inhibits debris from accumulating on the lens.

6. The system of claim 1, wherein, when the camera is active, the flow of gas exits the enclosure through the window to inhibit debris from accumulating on the lens during remote operation.

7. The system of claim 1, wherein, to cause the cover to move away from the first position, the flow of gas overcomes a biasing force to pivot the cover away from the first position.

8. The system of claim 1, further comprising:

a controller configured to switch the camera from inactive to active when the earthmoving machine is to be operated remotely, wherein the flow of gas is initiated simultaneously with activation of the camera.

9. A system associated with remote operation of an earthmoving machine, comprising:

an enclosure to be mounted on the earthmoving machine;

a camera within the enclosure;

a cover within the enclosure; and a controller configured to:

determine that the earthmoving machine is to be operated remotely; and cause, based on determining that the earthmoving machine is to be operated remotely, a flow of gas into the enclosure, wherein the flow of gas into the enclosure causes the cover to move away from a first position that is between a lens of the camera and a window of the enclosure.

10. The system of claim 9, wherein the controller is further configured to:

determine that remote operation of the earthmoving machine has ended; and stop, based on determining that the remote operation has ended, the flow of gas into the enclosure.

11. The system of claim 10, wherein terminating the flow of gas into the enclosure causes the cover to move to the first position.

12. The system of claim 9, wherein causing the flow of gas into the enclosure causes the cover to move to a second position that is not between the lens and the window.

13. The system of claim 9, wherein causing the flow of gas into the enclosure causes the cover to move to a second position such that a field of view of the camera is unobstructed by the cover.

14. The system of claim 9, wherein determining that the earthmoving machine is to be operated remotely is based on activation of the camera to display a video feed from the camera at a location outside a cab of the earthmoving machine.

15. A system comprising:

an enclosure including a front wall, a back wall, and a side wall that collectively define an interior space of the enclosure, the front wall including a window to be aligned with a lens of a camera that is to be positioned within the enclosure, and the rear wall including a port to be coupled to a gas supply into the interior space of the enclosure;

a guard assembly within the interior space of the enclosure and including:

a pivot joint coupled to the enclosure and configured to pivot the guard assembly about a lateral axis of the enclosure;

a cover coupled to the pivot joint towards the front wall; and a plate coupled to the pivot joint towards the back wall.

16. The system of claim 15, wherein the side wall includes a plurality of segments connected, along a longitudinal axis of the enclosure, between respective edges of the front wall and the back wall and including a top segment above the camera, a bottom segment below the camera, a first lateral segment on a first side of the camera along the lateral axis, and a second lateral segment on a second side of the camera along the lateral axis, and wherein the pivot joint includes a shaft coupled to the first and second lateral segments.

17. The system of claim 16, wherein the cover is coupled to the shaft by one or more front arms positioned laterally between the first or second side of the camera and the respective first or second lateral segment of the side wall.

18. The system of claim 16, wherein the plate is coupled to the shaft by one or more back arms positioned laterally between the first or second side of the camera and the respective first or second lateral segment of the side wall.

19. The system of claim 15, wherein pivoting of the guard assembly about the lateral axis causes the cover to move away from a first position between the window and the lens.

20. The system of claim 15, wherein a surface area of the cover is greater than a surface area of the lens.

* * * * *